United States Patent
Sakai (10) Patent No.: US 11,340,580 B2
(45) Date of Patent: May 24, 2022

(54) MACHINE STATE MONITORING DEVICE

(71) Applicant: FANUC CORPORATION, Yamanashi (JP)

(72) Inventor: Koujirou Sakai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/393,238

(22) Filed: Apr. 24, 2019

(65) Prior Publication Data

US 2019/0332090 A1 Oct. 31, 2019

(30) Foreign Application Priority Data

Apr. 27, 2018 (JP) .............................. JP2018-086752

(51) Int. Cl.
*G05B 19/4065* (2006.01)
(52) U.S. Cl.
CPC ..................... *G05B 19/4065* (2013.01); *G05B 2219/50203* (2013.01)
(58) Field of Classification Search
CPC ............ G05B 2219/36545; G05B 2219/50203
USPC ........................................................ 700/174
See application file for complete search history.

(56) References Cited

U.S. PATENT DOCUMENTS

| | | | | |
|---|---|---|---|---|
| 2011/0060281 | A1* | 3/2011 | Aeschlimann | G01R 31/3644 604/151 |
| 2017/0017209 | A1* | 1/2017 | Yamamoto | H02P 3/02 |
| 2017/0033726 | A1* | 2/2017 | Yamamoto | G06N 20/00 |

(Continued)

FOREIGN PATENT DOCUMENTS

| | | | |
|---|---|---|---|
| IN | 201621010876 A | * | 5/2016 |
| JP | 04205005 A | * | 7/1992 |
| JP | 5-171543 | | 7/1993 |

(Continued)

OTHER PUBLICATIONS

Finnerty, "Automated collection of real-time production data" The Fabricator, Sep. 30, 2008, 8 Pg. Print out by Finnerty, accessed at https://www.thefabricator.com/thefabricator/article/shopmanagement/automated-collection-of-real-time-production-data (Year: 2008).*

(Continued)

*Primary Examiner* — Emilio J Saavedra
(74) *Attorney, Agent, or Firm* — Wenderoth, Lind & Ponack, L.L.P.

(57) ABSTRACT

A machine state monitoring device is a machine state monitoring device that is intended for a motor drive device of a machine tool. The motor drive device includes: a motor; a converter and an inverter that adjust a power supply voltage; a power failure detection unit that acquires an input voltage of the motor drive device so as to detect a power failure in the motor drive device; and a communication unit that transmits, based on the result of the detection of the detection unit, a time when the power failure is started, and a time when the power failure is completed. The machine state monitoring device includes: a communication unit that receives information of the time when the power failure is started and the time when the power failure is completed from the communication unit of the motor drive device; and a storage unit that stores the information.

5 Claims, 4 Drawing Sheets

(56) References Cited

U.S. PATENT DOCUMENTS

2017/0270414 A1* 9/2017 Ignatova .................. G06N 5/04

FOREIGN PATENT DOCUMENTS

| | | | |
|---|---|---|---|
| JP | 11049446 A | * | 2/1999 |
| JP | 2006116623 A | * | 5/2006 |
| JP | 2008-37520 | | 2/2008 |
| JP | 2010-58090 | | 3/2010 |
| JP | 2017-28793 | | 2/2017 |
| JP | 2017-34832 | | 2/2017 |
| JP | 2017-167997 | | 9/2017 |
| JP | 2018-5489 | | 1/2018 |
| KR | 101834718 B1 | * | 3/2018 |

OTHER PUBLICATIONS

Smith, "Voltage sags and what to do about them" Plant Engineering, Aug. 2002, 56, 8 , pp. 28-32 (Year: 2002).*
Hargis, "Power Failure: What Does a Drive Do When Power Dips?" May 15, 2017, 9 page print out, https://www.theautomationengineer.com/technical/power-failure-drive-power-dips/ (Year: 2017).*
Sreejeth et al., "Monitoring, Control and Power Quality Issues of PLC Controlled Three-Phase AC Servomotor Drive" 2012 IEEE Fifth Power India Conference, Dec. 19-22, 2012, 5 pgs (Year: 2012).*
Notification of Reasons for Refusal dated May 19, 2020 in Japanese Patent Application No. 2018-086752.

* cited by examiner

MACHINE STATE MONITORING DEVICE

This application is based on and claims the benefit of priority from Japanese Patent Application No. 2018-086752, filed on 27 Apr. 2018, the content of which is incorporated herein by reference.

BACKGROUND OF THE INVENTION

Field of the Invention

The present invention relates to machine state monitoring devices.

Related Art

In a machine tool, a motor drive device for driving a motor in the machine tool is provided. The motor drive device is connected to an alternating-current power supply, and a power supply current is adjusted through a converter and an inverter and is then input to the motor. Since the motor is connected to the drive axis of the machine tool, it is necessary to keep the power supply of the motor drive device normal so that the machine tool is normally operated. However, when an abnormality occurs in the power supply of the motor drive device, for example, when a power failure occurs, an insufficient power supply voltage causes the motor to be stopped. A machine tool disclosed in patent document 1 monitors the voltage of a power supply in order to detect an abnormality in the power supply, and performs a protection operation of immediately stopping or retracting a motor according to the detection of a power failure so as to prevent the damage of the machine tool.

Patent Document 1: Japanese Unexamined Patent Application, Publication No. 2017-28793

SUMMARY OF THE INVENTION

However, in a general technology such as the technology of patent document 1, after the protection operation is performed, the power supply is turned off, power is thereafter returned in the initial state and thus it is likely that an operator cannot find the reason why the power of the machine tool is returned. When the operator manages a plurality of machine tools, the operator needs to individually check whether a power failure occurs in each of the machine tools, and thus the management may become complicated.

An object of the present invention is to provide a machine state monitoring device that can easily manage the state of a machine tool.

(1) A machine state monitoring device 100 according to the present invention is a machine state monitoring device that is intended for a motor drive device (for example, a motor drive device 10 described later) of a machine tool, the motor drive device includes: a motor (for example, a motor 30 described later); a converter (for example, a converter 11 described later) and an inverter (for example, an inverter 12 described later) that adjust a power supply voltage so as to supply power to the motor; a detection unit (for example, a power failure detection unit 15 described later) that acquires an input voltage of the motor drive device so as to detect a power failure in the motor drive device; and a transmission unit (for example, a communication unit 17 described later) that transmits, based on the result of the detection of the detection unit, a time when the power failure is started, and a time when the power failure is completed, and the machine state monitoring device includes: a reception unit (for example, a communication unit 120 described later) that receives information of the time when the power failure is started and the time when the power failure is completed from the transmission unit of the motor drive device provided in each of a plurality of the machine tools (for example, machine tools 1 to n described later); and a storage unit (for example, a storage unit 130 described later) that stores the information.

(2) Preferably, the transmission unit described in (1) transmits information on whether a protection operation for protecting the machine tool is completed during a period from the time when the power failure is started until the time when the power failure is completed, and the storage unit further stores the information.

(3) Preferably, the transmission unit described in (1) or (2) further transmits, to the machine state monitoring device, information of the state of machining in the machine tool when the power failure is detected, and the storage unit further stores the information.

(4) Preferably, the transmission unit described in any one of (1) to (3) further transmits, to the machine state monitoring device, information of the waveform of the input voltage at the time when the power failure is started, and the storage unit further records the information.

(5) Preferably, when a protection operation for protecting the machine tool is performed during a period from the time when the power failure is started until the time when the power failure is completed, the transmission unit described in any one of (1) to (4) further transmits, to the machine state monitoring device, at least one of pieces of information that are the speed of the motor, the torque of the motor, and the output voltage of the converter during the protection operation, and the storage unit further records the information.

(6) Preferably, after the power failure is completed and then the power of the machine tool is returned, the transmission unit described in any one of (1) to (5) transmits again the information to the machine state monitoring device.

(7) Preferably, the motor drive device described in any one of (1) to (6) further includes an anti-power failure device (for example, an anti-power failure device 40 described later) that includes an electric storage means, the transmission unit transmits information of the amount of electricity stored in the electric storage means, and the storage unit further stores the information.

(8) Preferably, the machine state monitoring device 100 described in any one of (1) to (7) further includes a control unit (for example, a control unit 110 described later) that controls the machine tools, and the control unit sets, for the detection unit in each of the machine tools, a voltage for the detection of the power failure by the detection unit.

According to the present invention, it is possible to provide a machine state monitoring device that can easily manage the state of a machine tool.

DETAILED DESCRIPTION OF THE INVENTION

Figure 1:
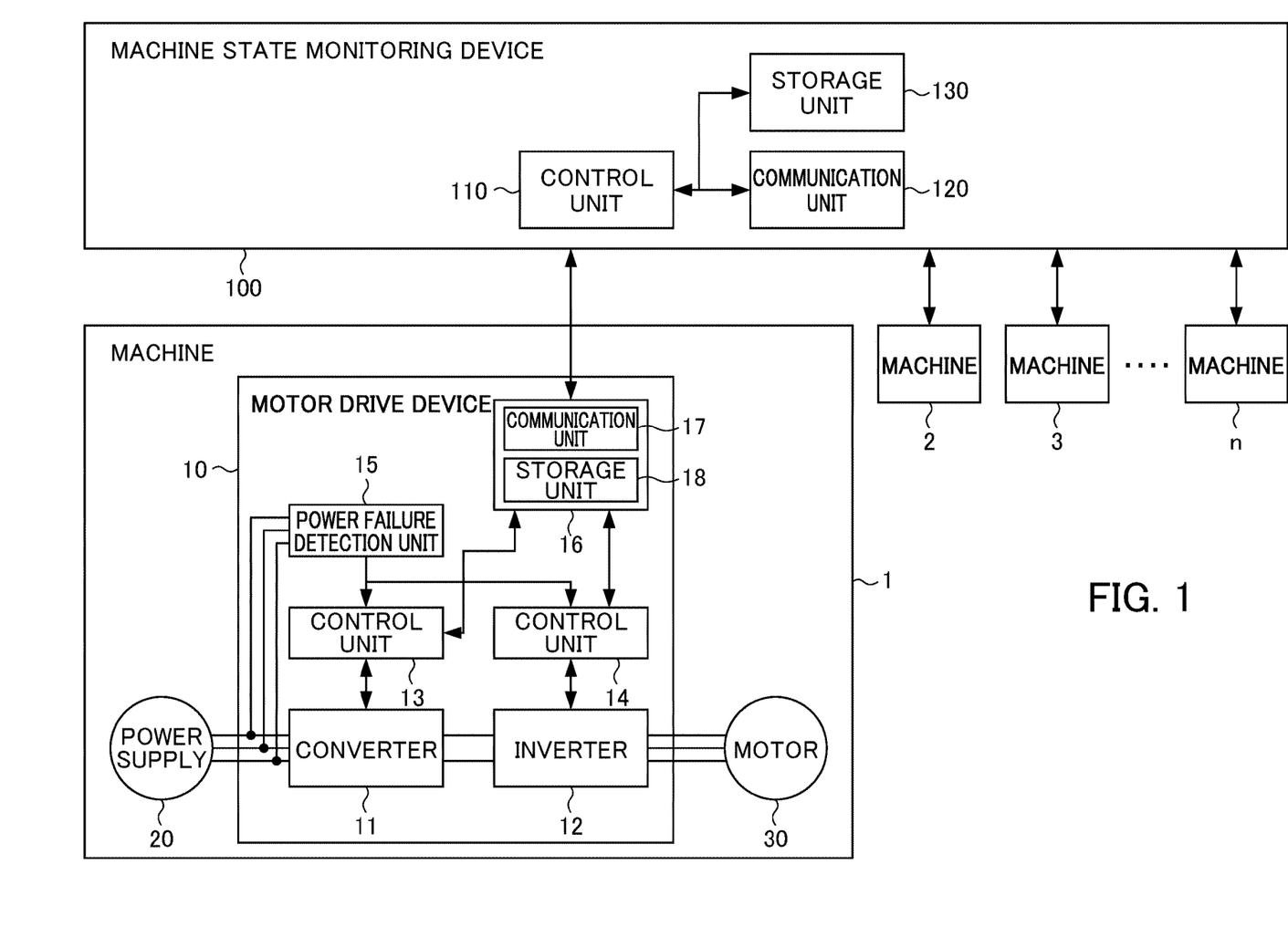
FIG. 1 is a block diagram showing an entire system that includes a machine state monitoring device according to a first embodiment of the present invention.

Embodiments of the present invention will be described below with reference to drawings. FIG. 1 is a block diagram showing an entire system that includes a machine state monitoring device according to a first embodiment of the present invention. The machine state monitoring device 100 is a device that monitors the states of operations of a plurality of machine tools 1 to n and is connected to the machine tools 1 to n so as to be able to communicate therewith. In the following discussion, when the machine tools 1 to n are not distinguished, a description will be given of the machine tool 1. Although the machine tool here typically refers to a machine that performs various types of machining, in addition thereto, the machine tool widely includes a transport mechanism, a movement mechanism, and the like that do not directly perform machining.

The machine state monitoring device 100 includes a control unit 110, a communication unit 120, and a storage unit 130. The control unit 110 controls the overall operation of the machine state monitoring device 100. The communication unit 120 receives information transmitted from the machine tools 1 to n, and the control unit 110 stores the received information in the storage unit 130. The control unit 110 performs, based on the information stored in the storage unit 130, predetermined control on the machine tool 1.

The machine tool 1 includes a motor drive device 10, a power supply 20, and a motor 30. The motor drive device 10 is connected to the power supply 20, and an alternating-current voltage input from the power supply 20 is adjusted through a converter 11 and an inverter 12 and is thereafter input to the motor 30. The motor 30 is connected to a drive axis that is not shown, and the motor 30 drives the drive axis so as to control a tool, whereby the machine tool 1 performs various type of machining such as cutting, welding, and the like on a workpiece.

A power failure detection unit 15 is connected between the power supply 20 and the converter 11 and acquires, from the power supply 20, an input voltage to the motor drive device 10. The power failure detection unit 15 detects the state of the power supply 20 based on the value of the input voltage, and for example, when the input voltage is significantly lowered, the power failure detection unit 15 detects that the power supply 20 is subjected to a power failure (hereinafter referred to as a "power failure state"). The voltage for detecting the power failure state may differ for each of the machine tools 1 to n.

The power failure detection unit 15 is connected to control units 13 and 14, and the information on the voltage detected in the power failure detection unit 15 is transmitted to the control units 13 and 14. The information on the voltage transmitted to the control units 13 and 14 is temporarily stored in the storage unit 18 of a controller 16 and is thereafter transmitted by a communication unit 17 to the machine state monitoring device 100.

The converter 11 is connected to the control unit 13, and the inverter 12 is connected to the control unit 14. The control units 13 and 14 can be controlled through the controller 16 by the machine state monitoring device 100. For example, the control unit 110 of the machine state monitoring device 100 can collectively set, for the power failure detection unit 15 in each of the machine tools 1 to n, the voltage when the power failure detection unit 15 detects the power failure state to an arbitrary voltage such as the same voltage or an individually different voltage.

The converter 11 converts the alternating-current voltage supplied from the power supply 20 into a direct-current voltage and inputs it to the inverter 12. The inverter 12 converts the direct-current voltage output by the converter 11 into an alternating-current voltage of a predetermined voltage and a predetermined frequency for driving the motor 30. In this way, the motor 30 is operated based on the alternating-current voltage of an arbitrary voltage and an arbitrary frequency.

Figure 2:
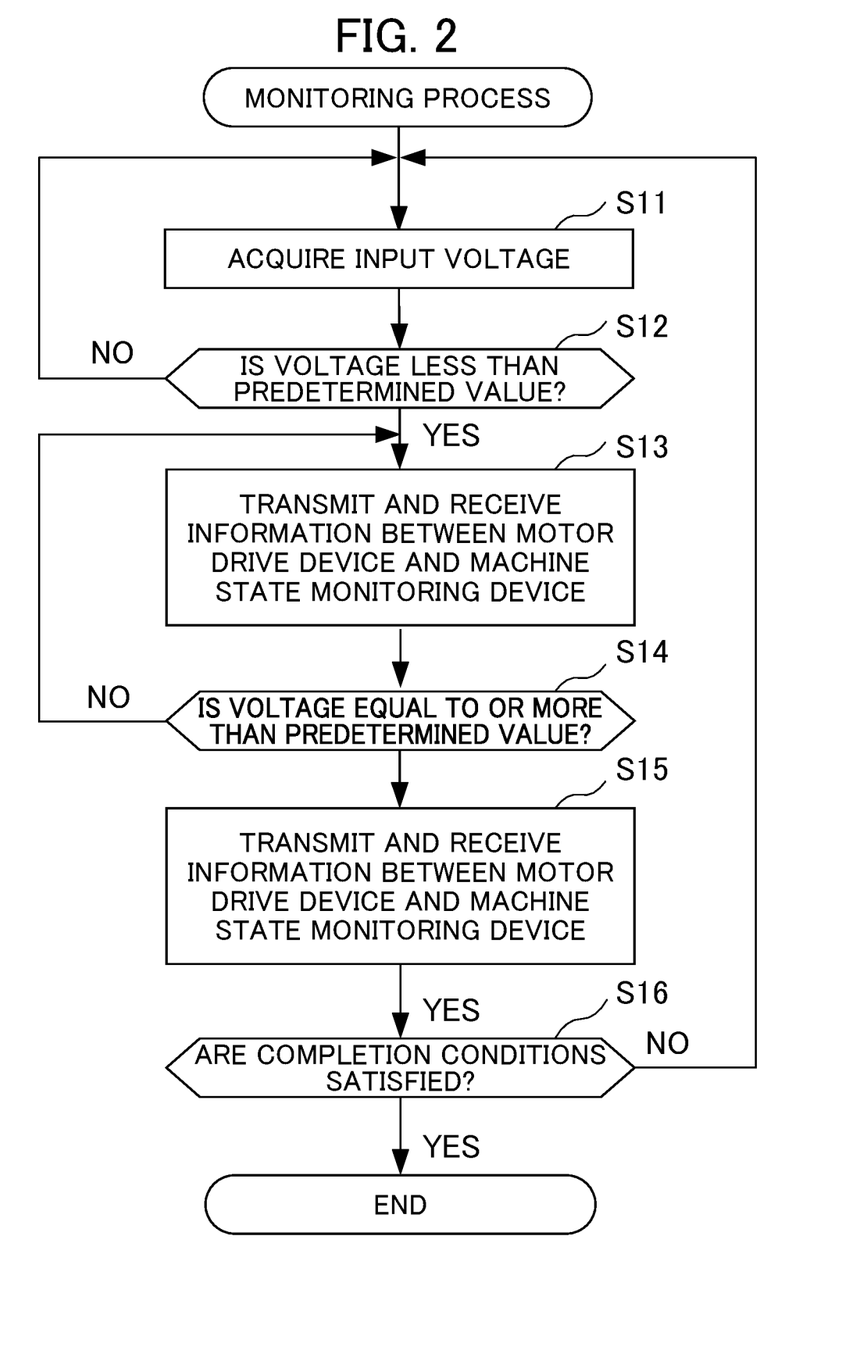
FIG. 2 is a flowchart showing a monitoring process in the first embodiment of the present invention.

FIG. 2 is a flowchart showing a monitoring process in the first embodiment of the present invention. The monitoring process is started when the power supply of the machine tool 1 is turned on and is completed when the power supply is turned off. A program (hereinafter referred to as a "monitoring process program") for performing the monitoring process is recorded in the storage unit 130.

In the monitoring process, when the power failure detection unit 15 acquires the input voltage from the power supply 20 so as to monitor the state of the power supply 20 and detects an abnormality in the power supply 20, the machine state monitoring device 100 performs predetermined processing described in detail below. Although for convenience of illustration, the monitoring process on the machine tool 1 will be described, actual monitoring process is performed in parallel on the machine tools 1 to n.

In step S11, the power failure detection unit 15 acquires the input voltage from the power supply 20. In step S12, the power failure detection unit 15 determines whether the acquired voltage is less than a predetermined value. Here, the predetermined value in the present embodiment refers to a low voltage that prevents the motor drive device 10 from being operated, for example, a voltage in the power failure state. In step S12, when the input voltage is equal to or more than the predetermined value, the processing in step S11 is repeated. In step S12, when it is determined that the input voltage is less than the predetermined value, that is, is in the power failure state, the process proceeds to step S13.

In step S13, the motor drive device 10 transmits, from the communication unit 17 of the controller 16 to the machine state monitoring device 100, all pieces of or at least any one of pieces of information that are the input voltage and its waveform, the time when the power failure state is detected, and the state of machining when the power failure state is detected. The machine state monitoring device 100 receives the information in the communication unit 120, and the received information is stored in the storage unit 130. The information is associated with each of the machine tools 1 to n so as to be individually recorded. The state of machining refers to, for example, the position information of the tool with respect to the workpiece or information indicating the step of the machining.

In step S14, whether the input voltage is equal to or more than the predetermined value is determined. When the input voltage is less than the predetermined value, the process returns to step S13, and the transmission/reception processing is performed. In step S14, it is determined that the input voltage is equal to or more than the predetermined value, the process proceeds to step S15.

In step S15, the motor drive device 10 transmits, from the communication unit 17 of the controller 16 to the machine state monitoring device 100, the same information as the information that is transmitted and received in step S13, and the time when the power is returned from the power failure state. The machine state monitoring device 100 receives the information in the communication unit 120, and the received information is stored in the storage unit 130. The information is associated with each of the machine tools 1 to n so as to be individually stored.

As described above, in step S15, the information that is transmitted and received in step S13 is transmitted again to the machine state monitoring device 100 after the power failure is completed, and the power of the machine tool 1 is returned. In this case, the information is temporarily recorded in the storage unit 18 when the information is acquired, and after it is determined in step S14 that the machine tool is restored, the communication unit 17 transmits the information in the storage unit to the machine state monitoring device 100.

In step S16, whether completion conditions are satisfied is determined. When the power supply of the machine tool 1 is turned off, it is determined that the completion conditions are satisfied, and thus the monitoring process is completed. On the other hand, when the power supply of the machine tool 1 is not turned off, the process returns to step S11, and the monitoring process is continued.

Figure 3:
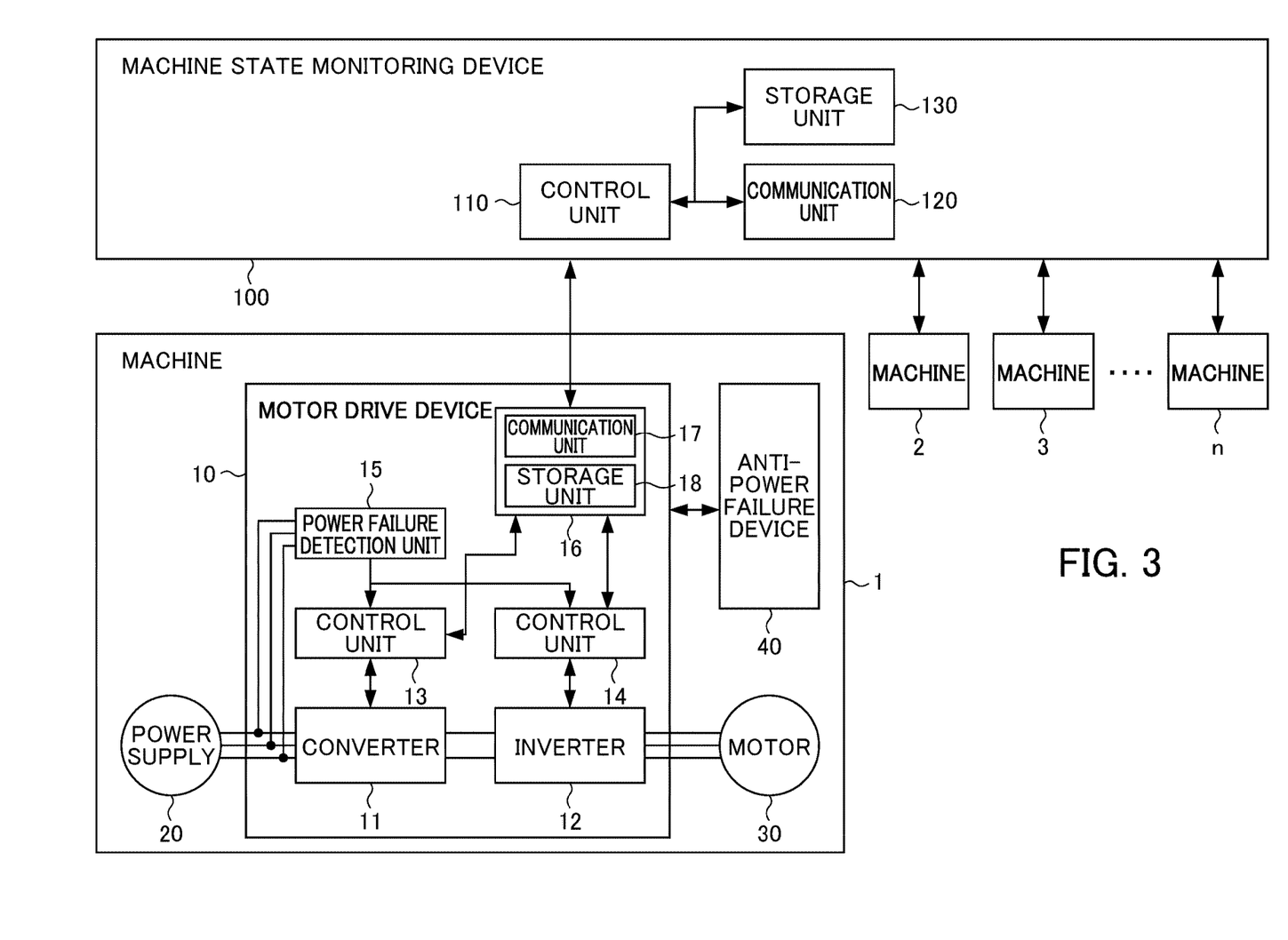
FIG. 3 is a block diagram showing an entire system that includes a machine state monitoring device according to a second embodiment of the present invention.
Figure 4:
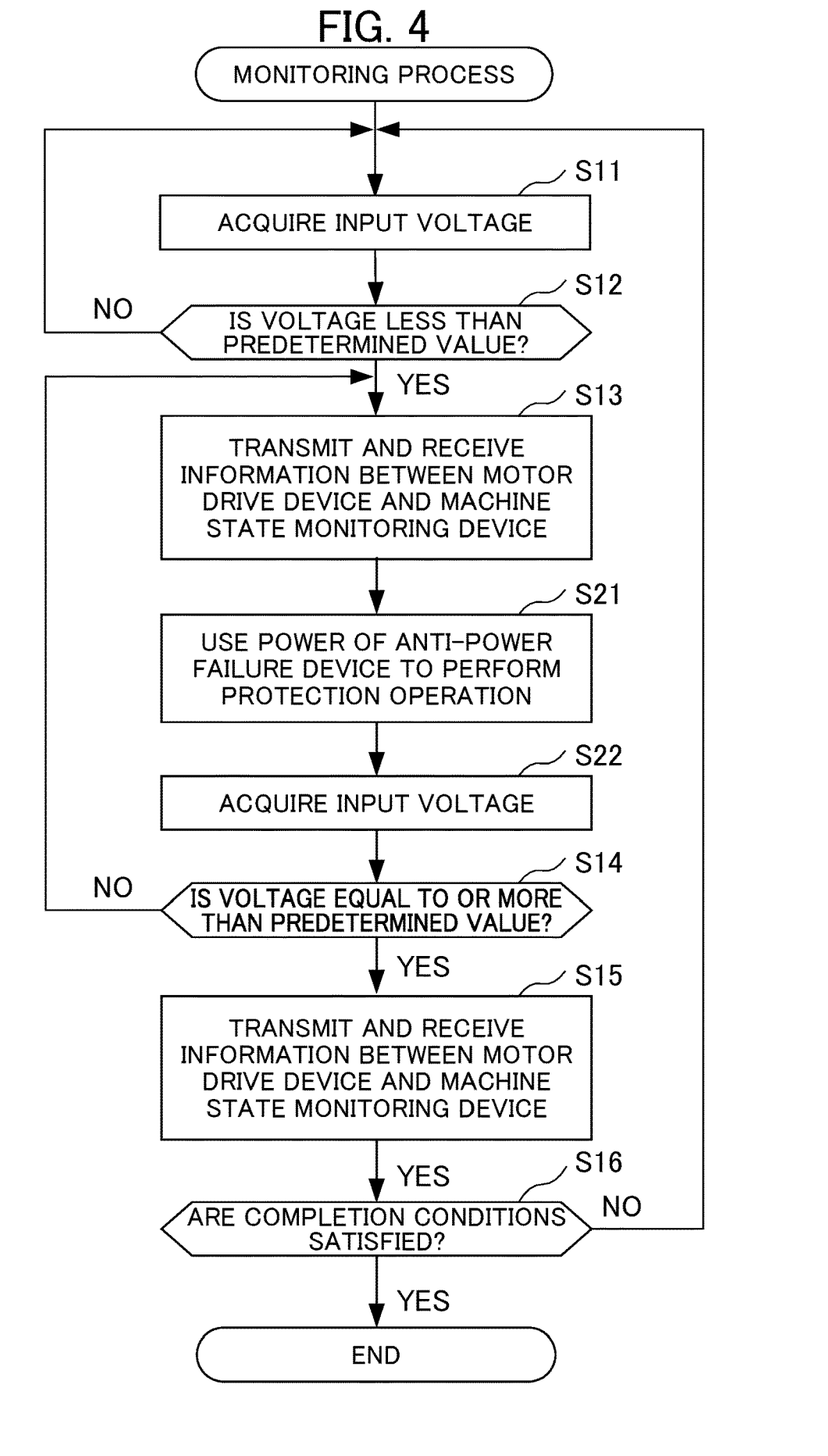
FIG. 4 is a flowchart showing a monitoring process in the second embodiment of the present invention.

With reference to FIGS. 3 and 4, a machine state monitoring device according to a second embodiment, and the monitoring process thereof will be described. The second embodiment differs from the first embodiment in that an anti-power failure device 40 is provided in the motor drive device 10 and that a protection operation is added in the monitoring process. The same configurations and processing as in the first embodiment are identified with the same reference numerals.

FIG. 3 is a block diagram showing the entire machine state monitoring device 100 according to the second embodiment. In FIG. 3, the anti-power failure device 40 is connected to the motor drive device 10, and includes a capacitor as an electric storage means that is not shown. When the anti-power failure device 40 receives a signal indicating the power failure state from a power failure detection unit 15, the anti-power failure device 40 starts to supply power to the motor drive device 10. When control units 13 and 14 receive the signal indicating the power failure state from the power failure detection unit 15, the control units 13 and 14 utilize the power supplied from the anti-power failure device 40 so as to perform the protection operation. The protection operation refers to, for example, drive control where a motor is stopped in order to prevent a failure in which a tool is erroneously operated due to a rapid change in voltage at the time of power failure and in which thus the tool itself and a workpiece are damaged.

FIG. 4 is a flowchart showing the monitoring process in the second embodiment. Processing in steps S11 to S13 are the same as in the first embodiment, and thus the description thereof will be omitted.

In step S21, when the power failure detection unit 15 detects a power failure, the control units 13 and 14 perform the protection operation. The protection operation includes, for example, the stop of the operation of the tool in the machine tool, and the retraction of the tool from the workpiece. When the power failure detection unit 15 detects the power failure, the power failure detection unit 15 transmits the signal indicating the power failure state to the control units 13 and 14, and the control units 13 and 14 control, through a converter 11 and an inverter 12, the motor 30 so as to stop the motor 30 or to move a drive axis in a direction in which the tool is retracted from the workpiece.

In step S22, the power failure detection unit 15 acquires the input voltage, and in step S14, whether the voltage is equal to or more than the predetermined value is determined. When the voltage is less than the predetermined value, since the machine tool 1 is still in the power failure state, the process returns to step S13, and the transmission and reception of the information, and the protection operation in step S21 are continued. In step S14, when it is determined that the voltage is equal to or more than the predetermined value, the machine tool 1 is determined to be restored, and thus the process proceeds to step S15. In step S15, as in the first embodiment, the information is transmitted and received between the motor drive device 10 and the machine state monitoring device 100.

In the second embodiment, in addition to the information transmitted in the first embodiment, a signal that indicates whether the protection operation is completed and the amount of electricity stored in the capacitor provided in the anti-power failure device are further transmitted to the machine state monitoring device 100. In a period from the time when the power failure is started until the time when the power failure is completed, all pieces of or at least one of pieces of information that are the speed of the motor 30, the torque of the motor 30, and the output voltage of the converter 11 while the protection operation for protecting the machine tool 1 is being performed are further transmitted to the machine state monitoring device 100.

When the processing in step S15 is completed, in step S16, as in the first embodiment, the completion conditions are determined, and the monitoring process is thereafter completed.

The machine state monitoring device 100 according to the embodiments described above achieve the following effects. When the machine tool 1 is stopped after a power failure occurs, the operator can individually and collectively manage the state of machining that indicates, for the machine tools 1 to n, which one of the machine tools 1 to n is stopped due to the power failure, when the machine tool is stopped, and whether the protection operation after the occurrence of the power failure is completed or up to which step the machining proceeded at the time of the power failure. In this way, the operator finds in which step the machining in each of the machine tools is interrupted, and thus the operator can grasp from which step the machining is restarted when the power is returned.

The operator can also grasp the factory in which the machine tool 1 is installed and the power condition in the area from the history of the time when the power failure occurs and the frequency at which the power failure occurs that is recorded in the storage unit 130. Furthermore, based on the history of the reception of the information resulting from the transmission and reception of the information performed twice, that is, after the power failure and after the power return, it is possible to distinguish between the machine tool 1 that is continuously operated after the power failure until the power return and the machine tool n that is not continuously operated. In other words, even in a power failure for a very short time, that is, a so-called instantaneous power failure, it is possible to easily distinguish between the machine tool 1 that can be continuously operated and the machine tool n that cannot be continuously operated. More specifically, the machine tool n in which the transmission and reception are interrupted after the power failure is a machine tool that is stopped before the power return so as not to be able to be continuously operated, and the machine tool 1 in which the transmission and reception are not interrupted after the power failure until after the power return is a machine tool that can be continuously operated. As described above, it is possible to grasp which one of the machine tools 1 to n is frequently stopped.

Furthermore, since the protection operation is performed by the power based on the electric storage of the capacitor in the anti-power failure device 40 after the power failure in the machine tool 1, when the amount of electricity stored in the capacitor is insufficient, it is likely that the protection operation is not completed. Hence, by the monitoring of the speed of the motor 30, the torque of the motor 30, and the output voltage of the converter 11 while the protection operation is being performed, it is possible to determine whether the protection operation after the power failure can be completed based on the amount of electricity stored in the anti-power failure device 40. Here, the waveform of the voltage is also monitored, and thus a decrease in the voltage after the power failure is predicted, whereby the operating time after the power failure can be more accurately determined. The amount of stored electricity and the like are also monitored, and thus in order to extend the operating time of the machine tool 1 after the power failure, it is possible to take measures such as the increasing of the capacity of the capacitor.

Although in the embodiments described above, the power failure state is detected based on the input voltage, it does not always need to be detected based on the voltage, and it may be detected based on any value as long as the value is an electrical signal that serves as a replacement thereof. As an example of the replacement value of the input voltage, a current value can be mentioned. When the protection operation after the power failure is not completed, the machine state monitoring device 100 may notify a user of the possibility that the workpiece or the tool is damaged. A notification means may be a display on a monitor that is not shown or a warning sound.

Although in the description of the embodiments discussed above, the monitoring process program is included in the machine state monitoring device 100, there is no limitation to this configuration. In other words, a configuration may be adopted in which part or the whole of the data base is included in another device (such as a data base server) that can communicate through a network and in which the machine state monitoring device 100 accesses the data base through the network as necessary.

Although in the embodiments described above, the capacitor is used as the electric storage means, embodiments are not limited thereto. As the electric storage means, for example, a capacitor such as an electric double layer capacitor or a lithium ion capacitor, a lithium ion battery, a battery or the like can be used.

The whole or part of the functions of the machine state monitoring device 100 of the embodiments described above can be realized by hardware, software, or a combination thereof. Here, the realization by software means that a processor reads and executes programs so as to achieve the realization. When part or the whole of the functions of the machine state monitoring device 100 is formed with hardware, it can be formed with an integrated circuit (IC) such as an ASIC (Application Specific Integrated Circuit), a gate array, an FPGA (Field Programmable Gate Array), or a CPLD (Complex Programmable Logic Device).

When the whole or part of the functions of the machine state monitoring device 100 is formed with software, in a computer that is formed with a storage unit such as a hard disk or a ROM that stores programs describing the whole or part of the operations of the machine state monitoring device 100, a DRAM that stores data necessary for computations, a CPU, and a bus that connects individual units, information necessary for computations is stored in the DRAM, and the programs are operated in the CPU, whereby the whole or part of the functions of the machine state monitoring device 100 can be realized.

These programs are stored with various types of computer readable media, and can be supplied to a computer. The computer readable media include various types of tangible storage media. Examples of the computer readable medium include magnetic recording media (for example, a flexible disk, a magnetic tape, and a hard disk drive), magneto-optical recording media (for example, a magneto-optical disk), a CD-ROM (Read Only Memory), a CD-R, a CD-R/W, a DVD-ROM (Digital Versatile Disk), a DVD-R, a DVD-R/W, semiconductor memories (for example, a mask ROM, a PROM (Programmable ROM), an EPROM (Erasable PROM), a flash memory, and a RAM (Random Access Memory)). These programs may be downloaded through a network into the computer of the user so as to be distributed.

EXPLANATION OF REFERENCE NUMERALS

1 to n: machine tool, 10: motor drive device, 11: converter, 12: inverter, 13: control unit, 14: control unit, 15: power failure detection unit, 16: controller, 20: power supply, 30: motor, 40: anti-power failure device, 100: machine state monitoring device, 110: control unit, 120: communication unit, 130: storage unit

What is claimed is:

1. A machine state monitoring device for monitoring a state of operation of a plurality of machine tools,
    wherein each of the plurality of machine tools includes a motor drive device including a motor, and a converter and an inverter that adjust a power supply voltage so as to supply power to the motor, and an anti-power failure device that includes a capacitor,
    wherein in each of the plurality of machine tools, the motor drive device acquires an input voltage of the motor drive device so as to detect a power failure in the motor drive device,
    wherein in each of the plurality of machine tools, when the input voltage of the motor drive device is less than a predetermined value, the motor drive device transmits first information including a time when the power failure in the motor drive device is started, and
    wherein in each of the plurality of machine tools, when the input voltage of the motor drive device becomes equal to more than the predetermined value after detection of the power failure in the motor drive device, the motor drive device transmits second information including a time when the power failure in the motor drive device is completed, the machine state monitoring device comprising:
    a processor; and
    a non-transitory memory having stored thereon executable instructions, which when executed, cause the processor to perform:
    receiving, from the motor drive device of at least one of the plurality of machine tools, the first information including the time when the power failure in the motor drive device is started and the second information including a time when the power failure in the motor drive device is completed; and
    storing the received first information and the received second information in association with the at least one of the plurality of machine tools,
    wherein the first information transmitted by the motor drive device further includes information of an amount of electricity stored in the capacitor, wherein when a protection operation for protecting the machine tool is performed during a period from the time when the power failure in the motor drive device is started until the time when the power failure in the motor drive device is completed, the second information transmitted by the motor drive device further includes at least one of pieces of information that are a speed of the motor, a torque of the motor, and an output voltage of the converter during the protection operation, and wherein the processor (i) monitors at least one of a speed of the motor, a torque of the motor, and an output voltage of the converter, (ii) determines, based on a change of the at least one of the speed of the motor, the torque of the motor, and the output voltage of the converter, whether the protection operation is completed during a period from the time when the power failure is started until the time when the power failure is completed, and (iii) determines whether an amount of electricity stored in the capacitor is sufficient for the protection operation.

2. The machine state monitoring device according to claim 1, wherein the first information transmitted by the motor drive device further includes information of a state of machining in the machine tool when the power failure in the motor drive device is detected.

3. The machine state monitoring device according to claim 1, wherein the first information transmitted by the motor drive device further includes information of a waveform of the input voltage at the time when the power failure in the motor drive device is started.

4. The machine state monitoring device according to claim 1, wherein the second information, which is transmitted when the input voltage of the motor drive device is equal to more than the predetermined value after detection of the power failure in the motor drive device, further includes the first information.

5. The machine state monitoring device according to claim 1, wherein for each of the plurality of machine tools, the processor sets individually the predetermined value for detection of the power failure in the motor drive device included in the machine tool.

* * * * *